(12) United States Patent  (10) Patent No.: US 9,032,328 B1
Kilat et al.  (45) Date of Patent: May 12, 2015

(54) CUSTOMIZING USER INTERFACES (75) Inventors: Kyle G. Kilat, Mountain View, CA (US); Christoper W. Andrew, Palo Alto, CA (US); Joseph W. Lasee, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 998 days.

(21) Appl. No.: 12/512,919

(22) Filed: Jul. 30, 2009

(51) Int. Cl.
*G06F 3/048* (2013.01)
*G06F 9/44* (2006.01)

(52) U.S. Cl.
CPC ..................................... *G06F 8/315* (2013.01)

(58) Field of Classification Search
CPC ...... G06F 9/4443; G06F 3/048; G06F 3/0237
USPC .......... 715/744, 745, 789, 811, 812, 814, 822, 715/823, 825
See application file for complete search history.

(56) References Cited

U.S. PATENT DOCUMENTS

| | | | |
|---|---|---|---|
| 5,726,688 A * | 3/1998 | Siefert et al. | 715/821 |
| 6,323,884 B1 * | 11/2001 | Bird et al. | 715/810 |
| 7,539,654 B2 * | 5/2009 | Ramaswamy et al. | 706/20 |
| 8,296,660 B2 * | 10/2012 | Macadaan et al. | 715/751 |
| 8,352,884 B2 * | 1/2013 | Zalewski et al. | 715/864 |
| 2002/0080192 A1 * | 6/2002 | King et al. | 345/811 |
| 2005/0071777 A1 * | 3/2005 | Roessler et al. | 715/810 |
| 2005/0266866 A1 * | 12/2005 | Ahya et al. | 455/502 |
| 2006/0095864 A1 * | 5/2006 | Mock et al. | 715/810 |
| 2006/0143298 A1 * | 6/2006 | Anttila et al. | 709/227 |
| 2007/0067744 A1 * | 3/2007 | Lane et al. | 715/860 |
| 2009/0070708 A1 * | 3/2009 | Finkelstein | 715/789 |
| 2010/0161833 A1 * | 6/2010 | Blewett et al. | 710/6 |

OTHER PUBLICATIONS

Greenberg et al., "Predictive interfaces: What will they think of next?" Nov. 1991, Technical Report 1991-448-32, Department of Computer Science, University of Calgary, pp. 1-27.*

* cited by examiner

*Primary Examiner* — Dino Kujundzic
(74) *Attorney, Agent, or Firm* — Osha • Liang LLP (57) ABSTRACT

A method for customizing a graphical user interface (GUI). The method includes identifying an event associated with the GUI and a user; matching the event to a trigger of a GUI pattern; identifying, within the GUI pattern, an expected interaction between the GUI and the user in response to the event; and modifying the GUI to improve user access to a graphical element involved in the expected interaction.

21 Claims, 6 Drawing Sheets

CUSTOMIZING USER INTERFACES

BACKGROUND

The graphical user interface (GUI) for a software application may have many graphical elements corresponding to the many functions of the software application. Some users of the software application may use a subset of all functions in the software application, and thus only manipulate the corresponding subset of graphical elements in the GUI. Other users of the software application may use a different subset of functions in the software application, and thus only manipulate the corresponding different subset of graphical elements. Regardless of which user is presently interacting with the GUI, all users are presented with essentially the same GUI.

SUMMARY

In general, in one aspect, the invention relates to a method for customizing a graphical user interface (GUI). The method comprises: identifying an event associated with the GUI and a user; matching the event to a trigger of a GUI pattern; identifying, within the GUI pattern, an expected interaction between the GUI and the user in response to the event; and modifying the GUI to improve user access to a graphical element involved in the expected interaction.

In general, in one aspect, the invention relates to a computer readable storage medium encoded with instructions for customizing a graphical user interface (GUI). The instructions comprising functionality to: identify an event associated with the GUI and the user; match the event to a trigger of a GUI pattern; identify, within the GUI pattern, an expected interaction between the GUI and the user in response to the event; and modify the GUI to improve user access to a graphical element of the GUI involved in the expected interaction.

In general, in one aspect, the invention relates to a system for modifying a graphical user interface (GUI). The system comprising: a monitoring module configured to identify an event associated with the GUI and a user; a pattern repository storing a GUI pattern having a trigger matching the event, wherein the GUI pattern identifies an expected interaction between the GUI and the user in response to the event; and a customization module operatively connected to the monitoring module and the repository, and configured to modify the GUI to improve user access to a graphical element of the GUI involved in the expected interaction.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for customizing a graphical user interface (GUI). Following an event associated with the GUI and/or user, the expected interaction between the GUI and the user in response to the event is identified (i.e., predicted) from a pre-existing GUI pattern. The GUI is then modified to improve user access to a graphical element involved in the expected interaction. Further, interactions between the GUI and one or more users may be tracked in order to recognize patterns (i.e., pattern recognition) and generate the GUI patterns. The GUI patterns may be part of a user's profile or part of a profile for a specific type of user.

Figure 1:
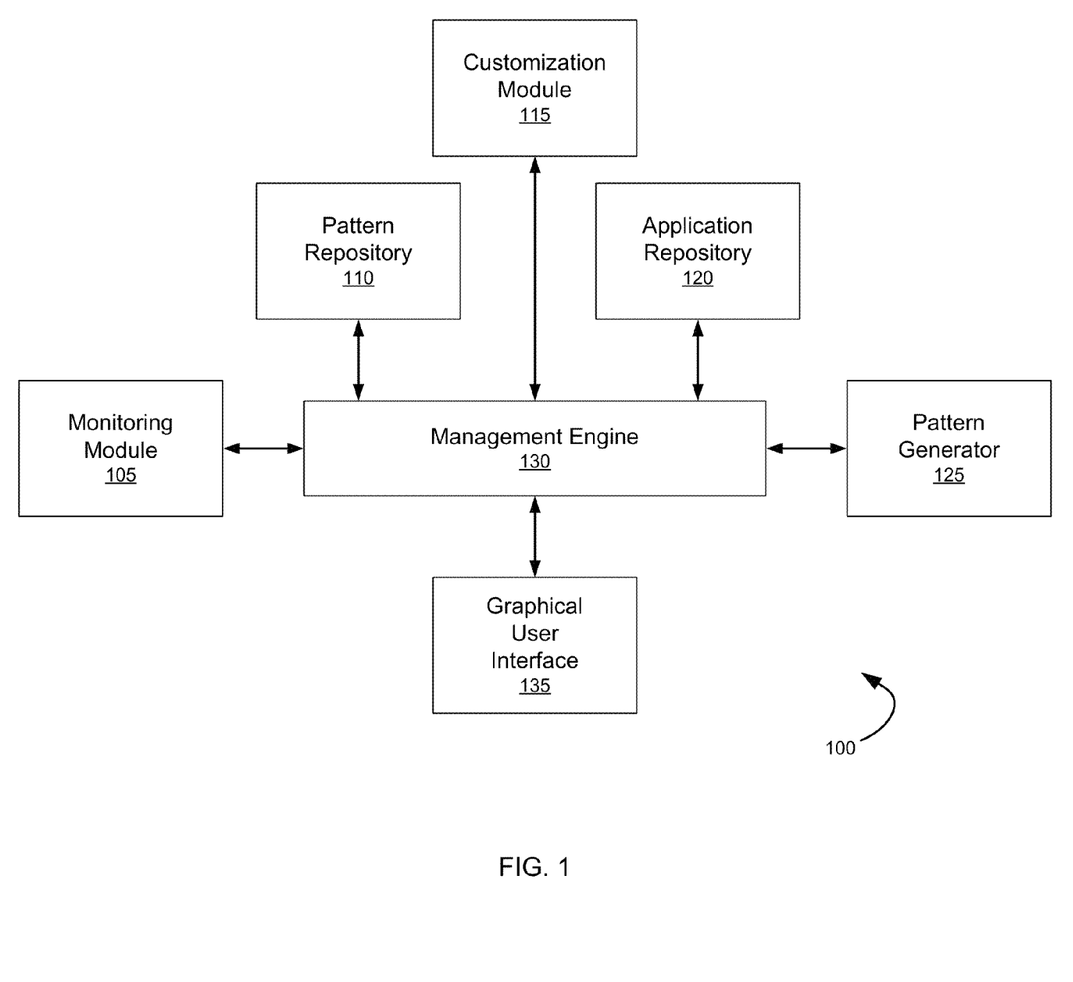
FIG. 1 shows a system in accordance with one or more embodiments of the invention.

FIG. 1 shows a system (100) in accordance with one or more embodiments of the invention. As shown in FIG. 1, the system (100) has multiple components including a monitoring module (105), a pattern repository (110), a customization module (115), an application repository (120), a pattern generator (125), a management engine (130), and a GUI (135). Each of these components are described below and may be located on the same device (e.g., a server, mainframe, desktop PC, laptop, PDA, television, cable box, satellite box, kiosk, telephone, mobile phone, etc.) or may be located on separate devices connected by a network (e.g., the Internet), with wired and/or wireless segments.

In one or more embodiments of the invention, the application repository (120) stores one or more software applications. Software applications in the application repository (120) may include word processing applications, image processing applications, operating systems, database applications, financial management applications, accounting applications, tax preparation applications, music composition applications, human resource (HR) applications, payroll applications, 401K management applications, etc. Software applications may be added to the application repository (120), deleted from the application repository (120), and/or upgraded in the application repository (120) at any time.

In one or more embodiments of the invention, software applications of the application repository (120) are accessible through a website. The website may store a profile for the user including a user name, password, job title, and industry employing the user, size of business operated by the user, type of business operated by the user, etc. The profile may also include ties to one or more GUI patterns (discussed below). In order to execute the software applications in the application repository (120), the user must log on to the website.

In one or more embodiments of the invention, the GUI (135) is a type of user interface for a software application (e.g., a software application in the application repository (120)). The GUI (135) presents both information to users and the functions of the software application available to users, including functions to log on to the software application, through graphical elements. Users then interact with the GUI (135), at least in part, through direct manipulation of the graphical elements (e.g., pushing buttons, selecting menu items, selecting radio buttons, clicking icons, checking boxes, etc.) (discussed below).

In one or more embodiments of the invention, a graphical element in the GUI (135) corresponds to an available function of the software application. Accordingly, a user may request the function be executed by manipulating the graphical element. In such embodiments of the invention, an interaction between the GUI (135) and the user is defined as a manipulation of a graphical element. In other words, the interaction between the GUI (135) and the user includes a request to execute the software application function, and the graphical element is involved in the interaction.

Consider the following exemplary functions which are not meant to limit the invention in any way. Each of the following functions may correspond to a graphical element in the GUI (135). A word processing software application may have functions to open documents, close documents, save documents, bold text, underline text, etc. An image processing software application may have functions to open images, close images, crop images, scale images, adjust the contrast of images, etc. A payroll software application may include functions to run employee payroll. Similarly, an financial management software application may include functions to email financial statements to an accountant or tax attorney.

In one or more embodiments of the invention, an icon is a type of graphical element in the GUI (135). An icon is a small image that represents an object such as a file, a software application, a function etc. By manipulating the icon (i.e., selecting the icon using a pointer, keyboard, etc.) the file, software application, function corresponding to the icon is opened and/or executed. Icons may be of any size, shape, and color. However, the position of the icon within the GUI (135) and the appearance of the icon within the GUI (135) may be changed in real-time (e.g., a different size, shape, and/or color).

In one or more embodiments of the invention, a menu is a type of graphical element in the GUI (135). Specifically, a menu is a list of items for selection by a user. An item in the list may correspond to a function of a software application. Accordingly, by manipulating a menu item (e.g., selecting the menu item using the pointer, keyboard, etc.), the user may request the corresponding software application function be execution. Alternatively, an item in the list may correspond to an additional menu. In other words, multiple menus may be arranged in a hierarchy and a menu item may be considered a subcategory of the menu. Menus may be of any size and have any number of hierarchies. However, the appearance of a menu item may be changed in real-time. For example, the order in which menu items are listed in a menu may be changed. As another example, one or more menu items may be highlighted, bolded, shown in a different color and/or different font, etc.

In one or more embodiments of the invention, a widget is a type of graphical element in the GUI (135). By manipulating the widget (e.g., using a pointer, keyboard, or other input device), the user may request a function of the software application corresponding to the widget be executed. Examples of widgets include buttons, sliders, radio buttons, checkboxes, etc. The GUI (135) may have any type and any number of widgets. Further, the widgets may take on any size, shape, and/or color. However, both the position of a widget within the GUI (135) and the appearance of the widget within the GUI (135) may be changed in real-time.

In one or more embodiments of the invention, the GUI (135) is used for a single software application (e.g., a software application in the application repository (120)). Alternatively, the GUI (135) may be used for multiple software applications, with each software application having a window in the GUI (135) (i.e., a portion of the GUI (135)). In other words, different graphical elements in the GUI (135) may correspond to functions of different software applications.

Some interactions frequently take place in response to an event. In other words, if the event occurs, it is highly probable that the interactions will also take place. The event and the corresponding interactions may be referred to as a GUI pattern. Moreover, the event may be referred to as a trigger of the GUI pattern, and the one or more interactions may be referred to as expected interactions of the GUI pattern. In one or more embodiments of the invention, the pattern generator (125) is configured to identify GUI patterns. Specifically, the pattern generator (125) is configured to track repetitive interactions between the GUI (135) and at least one user, and identify the common event that triggered the interactions to take place (discussed below).

In one or more embodiments of the invention, the event is a timeslot. For example, interaction A may always take place within a window surrounding 6:00 pm on weeknights. As another example, interaction X and interaction Y may always take place on the $15^{th}$ and the $30^{th}$ of the month. As yet another example, interaction Z may take place every two weeks during the year.

In one or more embodiments of the invention, the event is an initial interaction between the GUI and a user. For example, interaction C may always take place in response to interaction B taking place. In such embodiments, interaction B and interaction C form a GUI pattern, the event and trigger of the GUI pattern is interaction B, and the expected interaction of the GUI pattern is interaction C. In one or more embodiments of the invention, the event may be a combination of a timeslot and an initial interaction.

In one or more embodiments of the invention, in addition to identifying GUI patterns for an initial user or initial set of users, the pattern generator (125) is also configured to identify other users likely to be involved in similar GUI patterns. These other users may be identified by matching the characteristics of the other users to the characteristics of the initial user or initial set of users. The characteristics may include job titles, industries, the size of businesses the users operation, the type of businesses the users operate, etc. The GUI patterns may be tied to and/or stored in the profiles of these other users.

In one or more embodiments of the invention, the pattern repository (110) is configured to store one or more GUI patterns. The pattern repository (110) may also store profiles for specific users and/or profiles for specific types of users (i.e., users having a specific set of characteristics). As discussed above, the profiles may include multiple characteristic pertaining to the user. As also discussed above, each profile may include and/or be linked to one or more GUI patterns previously involving the user or likely to involve the user.

In one or more embodiments of the invention, the monitoring module (105) is configured to identify an event associated with the GUI (135) and the user. As the event may be a timeslot (discusses above), the monitoring module (105) may be configured to access a clock and/or calendar (not shown) to determine an occurrence of the timeslot. Alternatively, as the event may be an initial interaction between the GUI (135) and the user, the monitoring module may also be configured to listen for interactions between the GUI (135) and the user.

In one or more embodiments of the invention, once an event is identified, the monitoring module (105) is configured to locate a GUI pattern having a trigger matching the event. The event may be compared with the triggers of all GUI patterns. Alternatively, the event may only be compared with the triggers of GUI patterns linked to the user's profile and/or a linked to a profile for a type of user corresponding to the user.

In one or more embodiments of the invention, the customization module (115) is configured to modify the GUI (135).

Specifically, the customization module (115) is configured to modifying the GUI (135) to improve user access to a graphical element involved in an expected interaction. This may include increasing the size of the graphical element to improve visibility of the graphical element, changing a color of the graphical element to improve visibility of the graphical element, creating and/or changing a keyboard shortcut for the graphical element to avoid interacting with multiple hierarchies of a menu, changing the font of the graphical element to improve visibility of the graphical element, animating the graphical element to improve visibility of the graphical element, repositioning the graphical element to improve visibility of the graphical element, changing the order of the graphical element in a menu to avoid long searches within the menu, highlighting the graphical element, etc. In one or more embodiments of the invention, the customization module (115) modifies the GUI (135) by issuing commands to the application programming interface(s) (API) of the one or more applications being accessed through the GUI (135).

In one or more embodiments of the invention, the customization module (115) performs the customizations in accordance with a user's preferences. For example, the user's preferences may state that some graphical elements are not to be changed even though the graphical elements are involved in expected interactions. As another example, the user's preferences may state which type of changes to a graphical element are permitted and/or which type of changes to the graphical element are prohibited.

In one or more embodiments of the invention, the management engine (130) provides a link between the monitoring module (105), the pattern repository (110), the customization module (115), the application repository (120), the pattern generator (125), and the graphical user interface (135). The management engine (130) may be configured to convert data or commands from one format to another format in order to render the components (105, 110, 115, 120, 125, 135) compatible with each other. In one or more embodiments of the invention, the management engine (130) includes the GUI (135).

Figure 2:
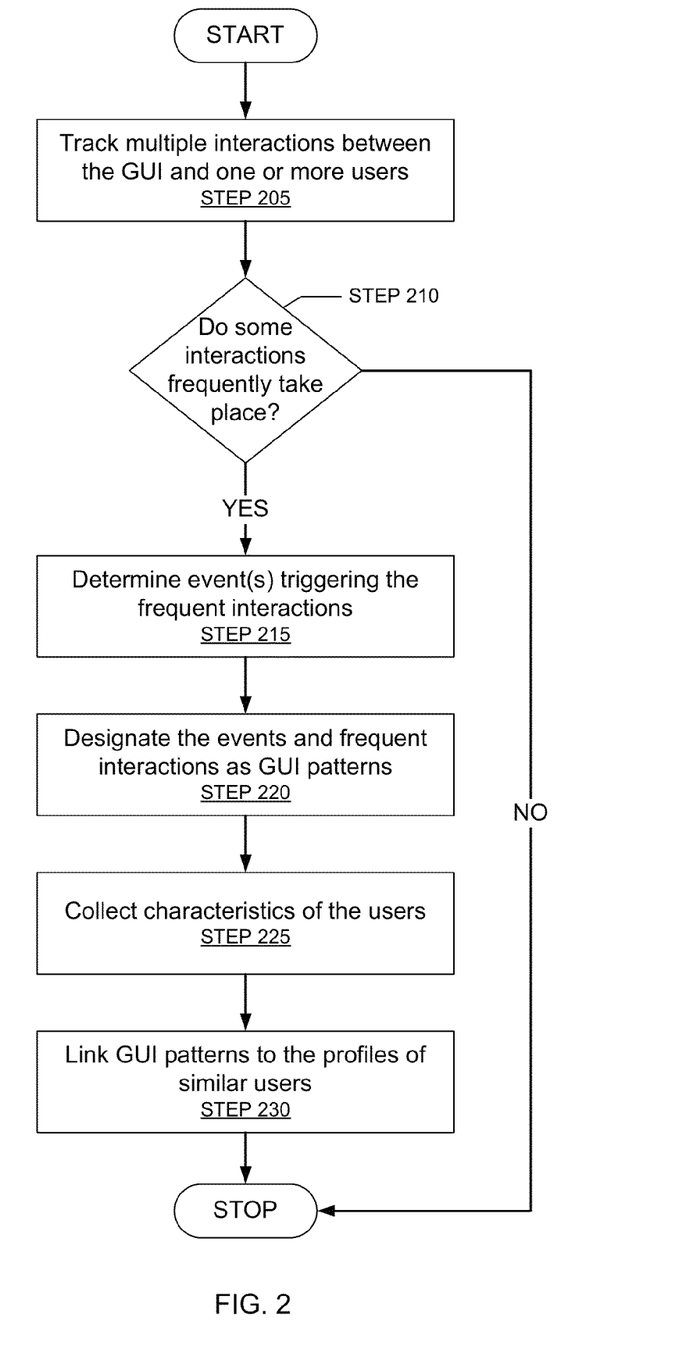
FIG. 2 and FIG. 3 show flowcharts in accordance with one or more embodiments of the invention.

FIG. 2 shows a flowchart in accordance with one or more embodiments of the invention. The process shown in FIG. 2 may be used to generate GUI patterns (e.g., using the pattern generator (125) discussed above in reference to FIG. 1). Those skilled in the art, having the benefit of this detailed description, will appreciate that the sequence of steps shown in FIG. 2 may differ among embodiments of the invention, and that one or more of the steps shown in FIG. 2 may be repeated or omitted.

Initially, multiple interactions between the GUI and one or more users are tracked (STEP 205). As discussed above, an interaction between the GUI (135) and the user may include a request, by a user, to execute a function of a software application function. As also discussed above, the request may be generated by through a user's manipulation of a graphical element in the GUI. In one or more embodiment of the invention, tracking the multiple interactions includes counting the number of times each interaction takes place on a per user basis and for all the users. Tracking the interactions may also including tracking a set of interactions that frequently take place together and in the same order. In one or more embodiments of the invention, tracking the interactions further includes creating timestamps for each occurrence of each interaction in order to identify when the interaction took place.

In STEP 210, it is determined whether some of the tracked interactions frequently take place. In one or more embodiments of the invention, the difference between a frequent and infrequent interaction is based on the count corresponding to the interaction. Specifically, the interaction corresponding to a count equaling or exceeding a threshold may be referred to as a frequent interaction. In contrast, an interaction corresponding to a count below the same threshold may be referred to as an infrequent interaction. When it is determined that at least one of the tracked interactions is a frequent interaction, the process proceeds to STEP 215. Otherwise, the process ends.

In STEP 215, the event responsible for triggering each of the frequent interactions is determined. As discussed above, an event may be a timeslot. Accordingly, by analyzing the timestamps from each occurrence of a frequent interaction, the triggering timeslot may be identified. As also discussed above, the event may be an initial interaction between the GUI and a user. This scenario is likely when a set of interactions frequently take place in the same order. In such scenarios, the first interaction of the set to take place is the event. In one or more embodiments of the invention, the event may be a combination of an initial transaction and a timeslot.

In STEP 220, the recently determined events and the corresponding interactions are designed (e.g., grouped) as GUI patterns. Specifically, the events are the trigger of the GUI patterns, and the corresponding frequent interactions are the expected interactions within the GUI patterns.

In STEP 225, the characteristics of the users from the tracking step (i.e., STEP 205) are collected. The characteristics may be determined by accessing profiles associated with the users. Alternatively, the characteristics may be determined by querying the users directly. As discussed above, the characteristics may include the job title of the user, the industry employing the users, the size of business operated by the users, the type of business operated by the user, etc.

In STEP 230, other users likely to be involved in the GUI patterns are identified. In one or more embodiments of the invention, the other users are identified based on the number of characteristics associated with the other users that match the recently collected characteristics (i.e., STEP 225). In one or more embodiments of the invention, the GUI patterns are stored in the profiles of the users from the tracking step (i.e., STEP 205) and in the profiles of the other (i.e., similar) users. Alternatively, the profiles of the users from the tracking step (i.e., STEP 205) and the profiles of the other (i.e., similar users) may be linked to the GUI patterns.

Figure 3:
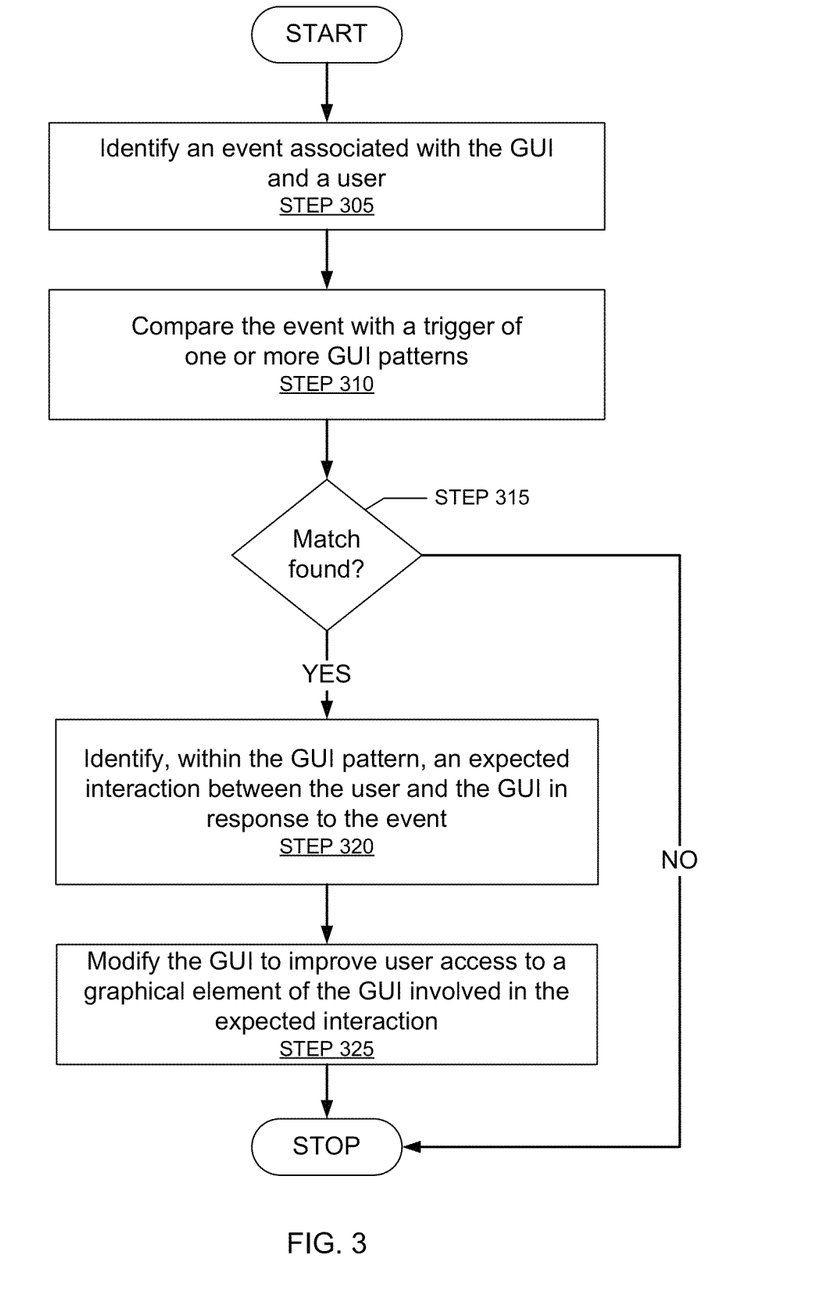

FIG. 3 shows a flowchart in accordance with one or more embodiments of the invention. The process shown in FIG. 3 may be used to customize a user interface. Those skilled in the art, having the benefit of this detailed description, will appreciate that the sequence of steps shown in FIG. 3 may differ among embodiments of the invention, and that one or more of the steps shown in FIG. 3 may be repeated or omitted.

Initially, an event associated with the GUI and the user is identified (STEP 305). As discussed above, the event may be a timeslot, or the starting of a timeslot. Accordingly, identifying the event may include accessing a clock or calendar. As also discussed above, the event may be an initial interaction between the GUI and the user, including a request to execute a function of a software application. Accordingly, identifying the event may include monitoring the GUI for a user's manipulation of a graphical element in the GUI.

In STEP 310, the identified event is compared with the triggers of multiple GUI patterns. As discussed above, a GUI pattern comprises a trigger and one or more expected interactions. In one or more embodiments of the invention, only the triggers of GUI patterns linked to the user's profile are compared with the event. Alternatively, triggers of the GUI patterns linked to a profile for a specific type of user (i.e., a type corresponding to the user), are compared with the event.

In STEP 315, it is determined whether a match exists between the event and a trigger of a GUI pattern. When it is determined that a match exists, the process proceeds to STEP 320, otherwise the process ends. In one or more embodiments of the invention, the match need not be an exact match (e.g., in the case of the time slot). In other words, in the case of a timeslot event, the difference between the event and the trigger may be within a predetermined tolerance.

In STEP 320, an expected interaction in response to the event is identified from the GUI pattern. As discussed above, the GUI pattern includes both a trigger matching the event, and one or more expected interactions. As the trigger has occurred (i.e., the matching event has occurred), it is highly probable the expected interactions will, in response to the trigger, also take place. In one or more embodiments of the invention, each of the expected interactions involves at least one graphical element in the GUI. Accordingly, as the trigger has occurred, it is highly probable that the user will attempt to manipulate the one or more graphical elements in the GUI corresponding to the expected interactions.

In STEP 325, the GUI is modified to improve the user's access to the one or more graphical elements involved in the one or more expected interactions. In one or more embodiments of the invention, improving the user's access to a graphical element in the GUI is accomplished by increasing the size of the graphical element, changing a color of the graphical element, creating and/or changing a keyboard shortcut for the graphical element, changing the font of the graphical element, animating the graphical element, repositioning the graphical element, changing the order of the graphical element in a menu, highlighting the graphical element, etc. In one or more embodiments of the invention, once the expected interaction has taken place, the GUI is changed back to the original appearance (i.e., the appearance before STEP 325).

Figure 4:
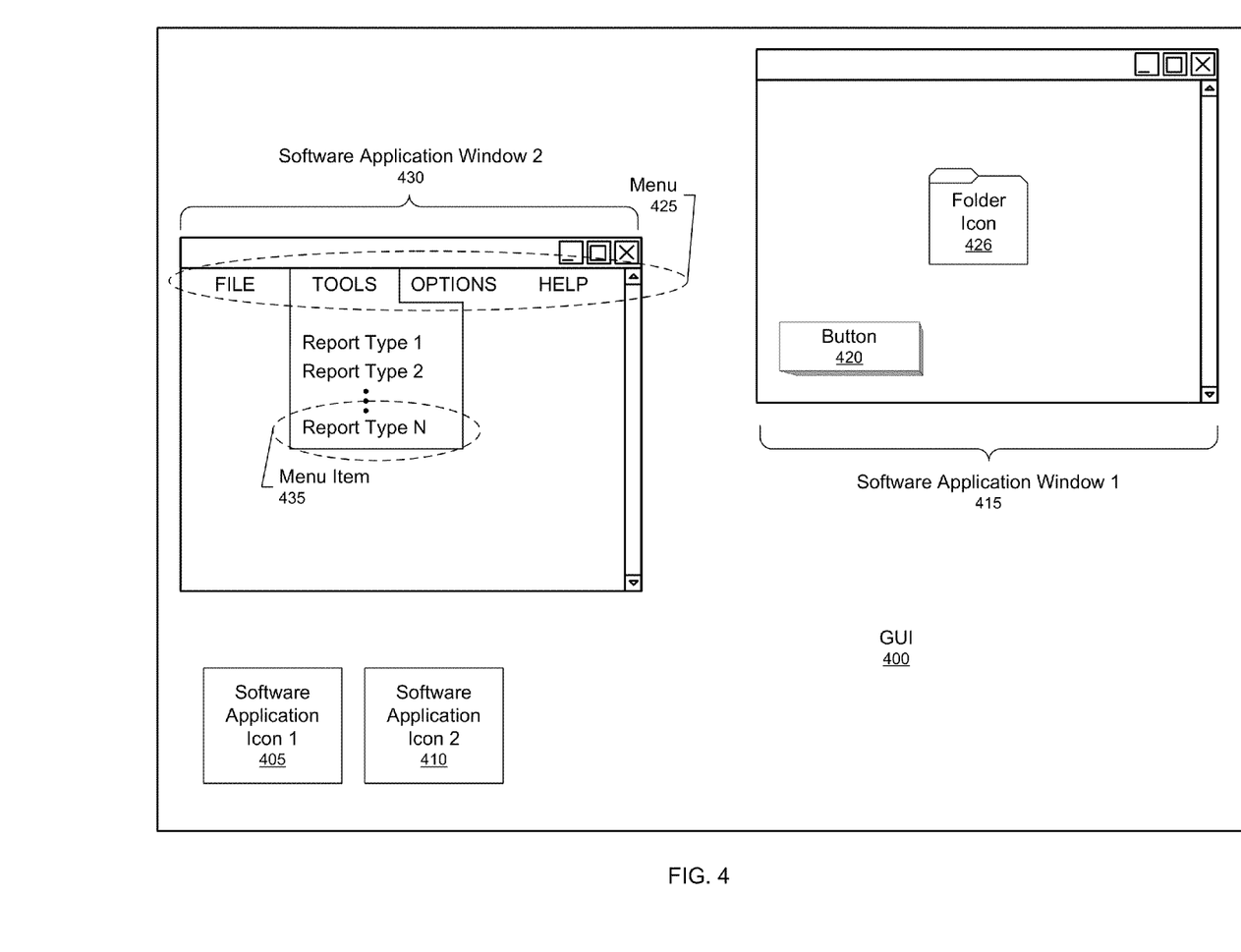
FIG. 4 and FIG. 5 show examples in accordance with one or more embodiments of the invention.

FIG. 4 shows an example in accordance with one or more embodiments of the invention. The GUI (400) of FIG. 4 has multiple graphical elements including icons (i.e., Software Application Icon 1 (405), Software Application Icon 2 (410), Folder Icon (426)), windows (i.e., Software Application Window 1 (415), Software Application Window 2 (430)), a menu (425) with menu item (435), and a button (420). In the Example of FIG. 4, the software application window (430) corresponds to a financial management software application. Accordingly, the menu (425), and specifically the menu item (435), correspond to functions available for execution by the financial management software application (e.g., generating financial reports of different types).

Consider the following. A user operating the GUI (400) has a profile linked to a GUI pattern. Further, the GUI pattern has a trigger corresponding to 6:00 pm on weeknights. Further still, the GUI pattern has one or more expected interactions involving the menu item (435), the button (420), and radio buttons (not shown) in the software application ("Application A") corresponding to the software application icon 2 (410). When 6:00 pm on a weeknight strikes, this event is matched to the trigger of the GUI pattern. Then, the expected interactions in response to the event are identified from the GUI pattern. Finally, the GUI (400) is modified to improve user access to the graphical elements involved in the expected interactions (i.e., menu item (435), the button (420), and the radio buttons (not shown)).

Figure 5:
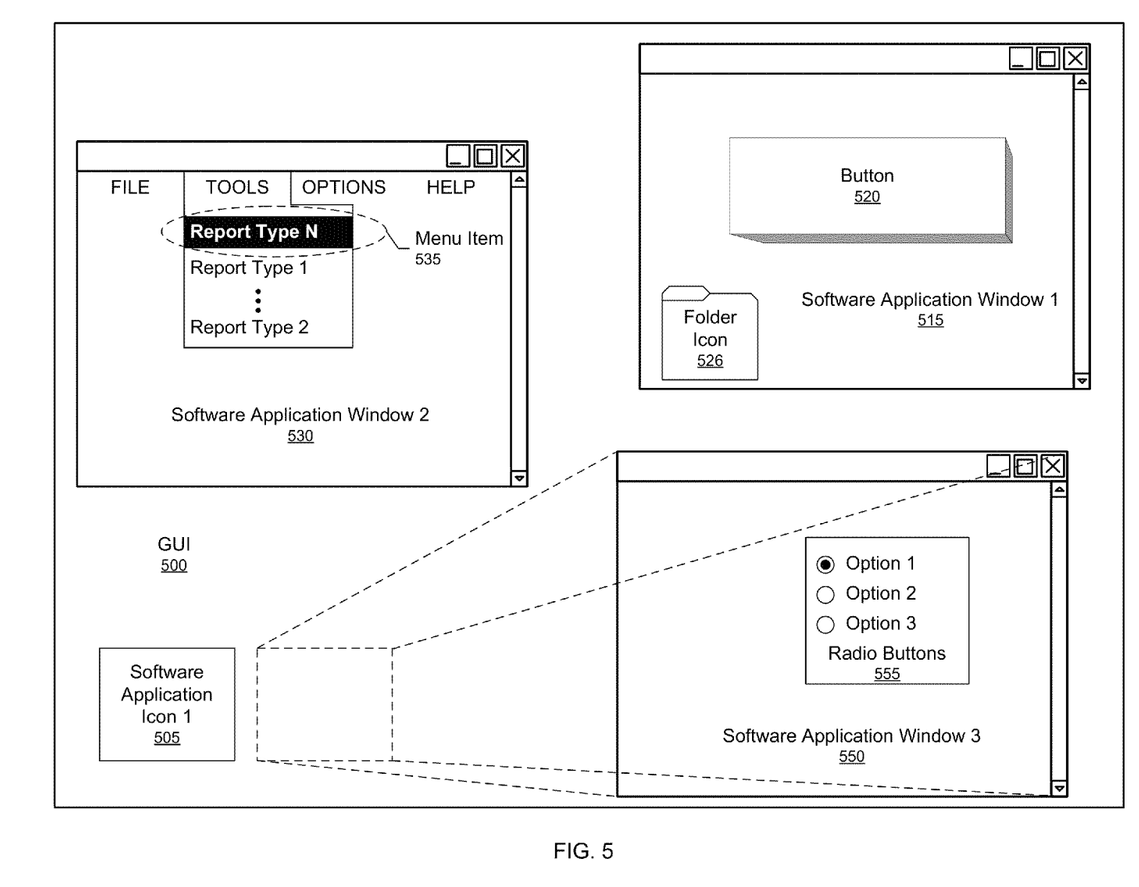

FIG. 5 shows an example in accordance with one or more embodiments of the invention. Specifically, the GUI (500) is the GUI (400) following modifications to the GUI (400). Similarly, the software application window 1 (515) and the software application window 2 (530) are the software application window 1 (415) and the software application window 2 (430), respectfully, following modifications to the GUI (400). Further, the menu item (535), the button (520), the folder icon (526), and the software application icon 1 (505) are the menu item (435), the button (420), the folder icon (426), and the software application icon 1 (405), respectively, following modifications to the GUI (400).

As shown in FIG. 5, the menu item (535) is in a different position, highlighted, and in a different color with respect to menu item (435). These modifications to GUI (400) improve user access to the menu item (435). Similarly, the button (520) is in a different position and is a different size with respect to the button (420). These modifications to GUI (400) improve user access to the button (420). Further still, Application A is now executing and using the GUI. Specifically, the software application window 3 (550) corresponds to Application A, and comprises the radio buttons (555) involved in one or more of the expected interactions. By executing Application A, user access to the radio buttons (555) is improved.

Those skilled in the art, having the benefit of this detailed description, will appreciate that in one or more embodiments of the invention, a GUI is customized solely by tracking and analyzing a user's interactions. In other words, the user is not required to manually setup and/or schedule the customizations. The customizations improve user access to one or more graphical elements in the GUI when it is predicted the user will attempt to manipulate the one or more graphical elements.

Figure 6:
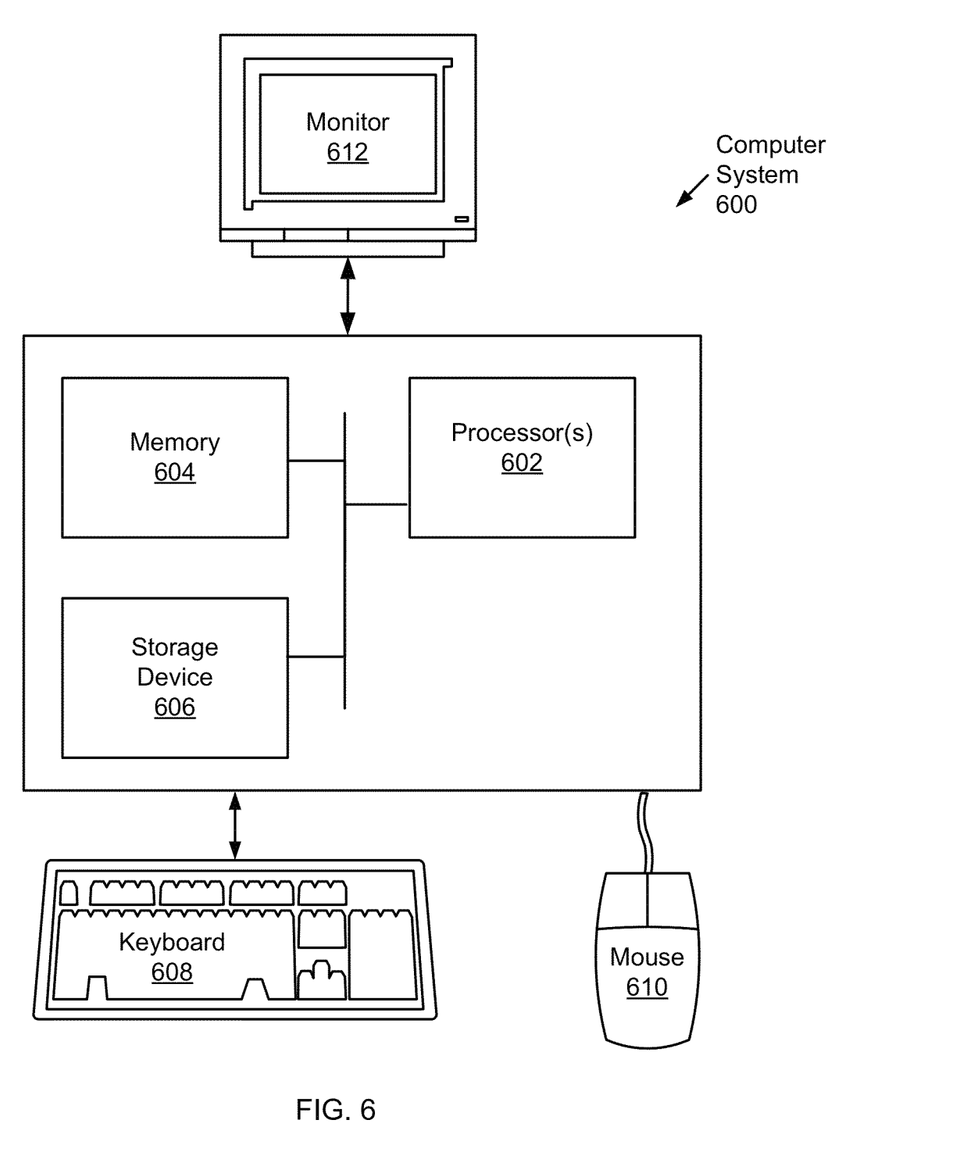
FIG. 6 shows a computer system in accordance with one or more embodiments of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer system (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., monitoring module, pattern generator, customization module, GUI) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable storage medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for customizing an original graphical user interface (GUI), comprising:
creating a GUI pattern based on an interaction of a first user with the original GUI;
associating the GUI pattern with a profile of the first user;
identifying a profile type of the profile of the first user;
matching the profile type to a profile of a second user;
associating, based on matching the profile type, the GUI pattern with the profile of the second user;
identifying an event associated with the original GUI and the second user;
generating, by a computer processor, a comparison of the event with a trigger of the GUI pattern associated with the profile of the second user;
matching, based on the comparison and by the computer processor, the event to the trigger of the GUI pattern;
identifying, within the GUI pattern and after matching the event to the trigger, an expected interaction between the original GUI and the second user in response to the event;
repositioning a graphical element of the original GUI involved in the expected interaction from a first position to a second position to obtain a modified GUI,
wherein the graphical element comprises at least one selected from a group consisting of a GUI widget and an icon,
wherein the modified GUI improves user access to the graphical element, and
wherein the second user selects the graphical element during the expected interaction; and
reverting, after the expected interaction takes place, from the modified GUI to the original GUI by repositioning the graphical element from the second position back to the first position.

2. The method of claim 1, wherein the event comprises a timeslot, and wherein the graphical element is visible before the timeslot and after the timeslot.

3. The method of claim 1, wherein matching the event to the trigger comprises comparing the event with a plurality of other triggers of a plurality of other GUI patterns associated with the profile of the second user.

4. The method of claim 3, wherein the profile of the second user is based on at least one selected form a group consisting of a job title of the second user and an industry employing the second user.

5. The method of claim 1, wherein the event is an initial interaction between the original GUI and the second user comprising a request from the second user to execute a function of a software application associated with the original GUI.

6. The method of claim 1, wherein the event is an initial interaction between the original GUI and the second user comprising a request to log onto the original GUI.

7. The method of claim 1, wherein the expected interaction comprises a request to execute a function of a software application.

8. The method of claim 1, further comprising:
animating, in response to identifying the expected interaction, the graphical element within the modified GUI.

9. The method of claim 1, further comprising:
changing, in response to identifying the expected interaction, an appearance of the graphical element,
wherein the graphical element further comprises at least one selected from a group consisting of a menu, and a menu item.

10. The method of claim 1, further comprising:
identifying at least one interaction between the original GUI and the second user in response to each occurrence of the event, wherein the at least one interaction comprises the expected interaction;
designating, before matching the event, the at least one interaction and the event as the GUI pattern; and
storing, before matching the event, the GUI pattern, wherein the event comprises at least one selected from a group consisting of a timeslot and an initial interaction between the original GUI and the second user.

11. A non-transitory computer readable storage medium encoded with instructions for customizing an original graphical user interface (GUI), the instructions comprising functionality to:
create a GUI pattern based on an interaction of a first user with the original GUI;
associate the GUI pattern with a profile of the first user;
identify a profile type of the profile of the first user;
match the profile type to a profile of a second user;
associate, based on matching the profile type, the GUI pattern with the profile of the second user;
identify an event associated with the original GUI and the second user;
generate a comparison of the event with a trigger of the GUI pattern associated with the profile of the second user;
match, based on the comparison, the event to the trigger of the GUI pattern;
identify, within the GUI pattern and after matching the event to the trigger, an expected interaction between the original GUI and the second user in response to the event;
reposition a graphical element of the original GUI involved in the expected interaction from a first position to a second position to obtain a modified GUI,
wherein the graphical element comprises at least one selected from a group consisting of a GUI widget and an icon,
wherein the modified GUI improves user access to the graphical element, and
wherein the second user selects the graphical element during the expected interaction; and
revert, after the expected interaction takes place, from the modified GUI to the original GUI by repositioning the graphical element from the second position back to the first position.

12. The non-transitory computer readable storage medium of claim 11, wherein the event comprises a timeslot, and wherein the graphical element is visible before the timeslot and after the timeslot.

13. The non-transitory computer readable storage medium of claim 11, wherein the event is an initial interaction between the original GUI and the second user comprising a request from the second user to execute a function of a software application associated with the original GUI.

14. The non-transitory computer readable storage medium of claim 11, wherein the expected interaction comprises a request to execute a function of a software application associated with the original GUI.

15. The non-transitory computer readable storage medium of claim 11, wherein matching the event to the trigger comprises comparing the event with a plurality of other triggers in the profile.

16. The non-transitory computer readable storage medium of claim 11, the instructions further comprising functionality to:

identify at least one interaction between the original GUI and the second user in response to each occurrence of the event, wherein the at least one interaction comprises the expected interaction;

designate, before matching the event, the at least one interaction and the event as the GUI pattern; and store, before matching the event, the GUI pattern, wherein the event comprises at least one selected from a group consisting of a timeslot and an initial interaction between the original GUI and the second user.

17. A system for modifying an original graphical user interface (GUI), comprising:

a computer processor;

a pattern generator executing on the computer processor and configured to:
- create a GUI pattern based on interaction of a first user with the original GUI;
- associate the GUI pattern with a profile of the first user;
- identify a profile type of the profile of the first user;
- match the profile type to a profile of a second user; and
- associate, based on matching the profile type, the GUI pattern with the profile of the second user;

a monitoring module configured to:
- identify an event associated with the original GUI and the user;
- generate a comparison of the event with a trigger of the GUI pattern associated with the profile of the second user; and
- match, based on the comparison, the event to the trigger of the GUI pattern;

a pattern repository storing the GUI pattern; and a customization module operatively connected to the monitoring module and the repository, and configured to:
- identify, within the GUI pattern and after matching the event to the trigger, an expected interaction between the original GUI and the second user in response to the event;
- reposition a graphical element of the original GUI involved in the expected interaction from a first position to a second position to obtain a modified GUI,
  - wherein the graphical element comprises at least one selected from a group consisting of a GUI widget and an icon,
  - wherein the modified GUI improves user access to the graphical element, and
  - wherein the second user selects the graphical element during the expected interaction; and
- revert, after the expected interaction takes place, from the modified GUI to the original GUI by repositioning the graphical element from the second position back to the first position.

18. The system of claim 17, wherein the pattern generator is further configured to:
identify at least one interaction between the original GUI and the user in response to each occurrence of the event.

19. The system of claim 17, further comprising:
an application repository operatively connected to the customization module and storing a plurality of software applications accessible from the original GUI, wherein the original GUI is part of a website accessed by the user.

20. The system of claim 17, wherein the expected interaction comprises a request to execute a function of a software application.

21. The system of claim 17, wherein the event comprises a timeslot, and wherein the graphical element is visible before the time slot and after the timeslot.

* * * * *